(12) United States Patent
Mahoney et al.

(10) Patent No.: US 12,045,596 B2
(45) Date of Patent: *Jul. 23, 2024

(54) DEPLOYMENT OF A COMPUTING ENVIRONMENT

(71) Applicant: Capital One Services, LLC, McLean, VA (US)

(72) Inventors: John Mahoney, Narberth, PA (US); Raymond Hoagland, San Jose, CA (US); Kristen Koyanagi, Falls Church, VA (US)

(73) Assignee: Capital One Services, LLC, McLean, VA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/350,785

(22) Filed: Jul. 12, 2023

(65) Prior Publication Data

US 2023/0350658 A1    Nov. 2, 2023

Related U.S. Application Data

(63) Continuation of application No. 17/301,694, filed on Apr. 12, 2021, now Pat. No. 11,726,759.

(51) Int. Cl.
*G06F 8/60* (2018.01)
*H04L 67/06* (2022.01)
*H04L 67/10* (2022.01)

(52) U.S. Cl.
CPC ............. *G06F 8/60* (2013.01); *H04L 67/06* (2013.01); *H04L 67/10* (2013.01)

(58) Field of Classification Search
None
See application file for complete search history.

(56) References Cited

U.S. PATENT DOCUMENTS

| | | | |
|---|---|---|---|
| 10,708,135 | B1 | 7/2020 | Elliott, IV |
| 10,990,370 | B1 | 4/2021 | Bawcom |
| 11,157,253 | B1 | 10/2021 | Shteyman et al. |
| 11,231,457 | B1 | 1/2022 | Sarusi et al. |
| 11,237,821 | B1 | 2/2022 | Hoeft et al. |
| 11,281,503 | B2 | 3/2022 | Giannetti |
| 2005/0182601 | A1 | 8/2005 | Deguchi |
| 2005/0267918 | A1 | 12/2005 | Gatev et al. |
| 2007/0073851 | A1 | 3/2007 | Baikov et al. |
| 2011/0145767 | A1 | 6/2011 | Satou et al. |
| 2014/0195663 | A1 | 7/2014 | Hirschenberger et al. |
| 2019/0158537 | A1 | 5/2019 | Miriyala |
| 2019/0304445 | A1 | 10/2019 | Nahamoo et al. |
| 2021/0200527 | A1 | 7/2021 | Sanchez et al. |
| 2022/0052910 | A1 | 2/2022 | Neelakantam et al. |
| 2022/0326924 | A1 | 10/2022 | Mahoney et al. |

*Primary Examiner* — Philip Wang
*Assistant Examiner* — Rongfa P Wang
(74) *Attorney, Agent, or Firm* — Harrity & Harrity, LLP

(57) ABSTRACT

In some implementations, a device may determine that a computing environment is to be deployed. The computing environment may be associated with an infrastructure configuration. The device may obtain, from a repository, one or more definition files for the infrastructure configuration. The repository may include definition files associated with multiple infrastructure configurations. The device may cause deployment of the computing environment based on the one or more definition files.

20 Claims, 6 Drawing Sheets

DEPLOYMENT OF A COMPUTING ENVIRONMENT

RELATED APPLICATION

This application is a continuation of U.S. patent application Ser. No. 17/301,694, filed Apr. 12, 2021, which is incorporated herein by reference in its entirety.

BACKGROUND

Infrastructure as code (IaC) uses machine-readable definition files, rather than physical hardware configurations or interactive configuration tools, for managing and provisioning computer data centers. Continuous configuration automation can leverage IaC to automate the deployment and configuration of settings of data center infrastructure.

SUMMARY

In some implementations, a system for deploying a computing environment includes one or more memories and one or more processors, communicatively coupled to the one or more memories, configured to: receive an indication that the computing environment is to be deployed in a cloud computing environment, wherein the computing environment is associated with an infrastructure configuration; determine, based on the indication, a code configuration that is to be used for deployment of the computing environment; obtain, from a repository and using the code configuration, a set of definition files for the infrastructure configuration, wherein the repository includes definition files associated with multiple infrastructure configurations, and wherein the set of definition files includes one or more first definition files common to a plurality of the multiple infrastructure configurations and one or more second definition files particular to the infrastructure configuration; and cause deployment of the computing environment based on the set of definition files.

In some implementations, a method of deploying a computing environment includes determining, by a device, that the computing environment is to be deployed, wherein the computing environment is associated with an infrastructure configuration; obtaining, by the device, from a repository, one or more definition files for the infrastructure configuration, wherein the repository includes definition files associated with multiple infrastructure configurations; and causing, by the device, deployment of the computing environment based on the one or more definition files.

In some implementations, a non-transitory computer-readable medium storing a set of instructions for deploying a computing environment includes one or more instructions that, when executed by one or more processors of a device, cause the device to: determine a code configuration that is to be used for the computing environment; obtain, from a repository and using the code configuration, a set of definition files for an infrastructure configuration associated with the computing environment; and provide the set of definition files to a deployment application to cause deployment of the computing environment based on the set of definition files.

DETAILED DESCRIPTION

Figure 1A:
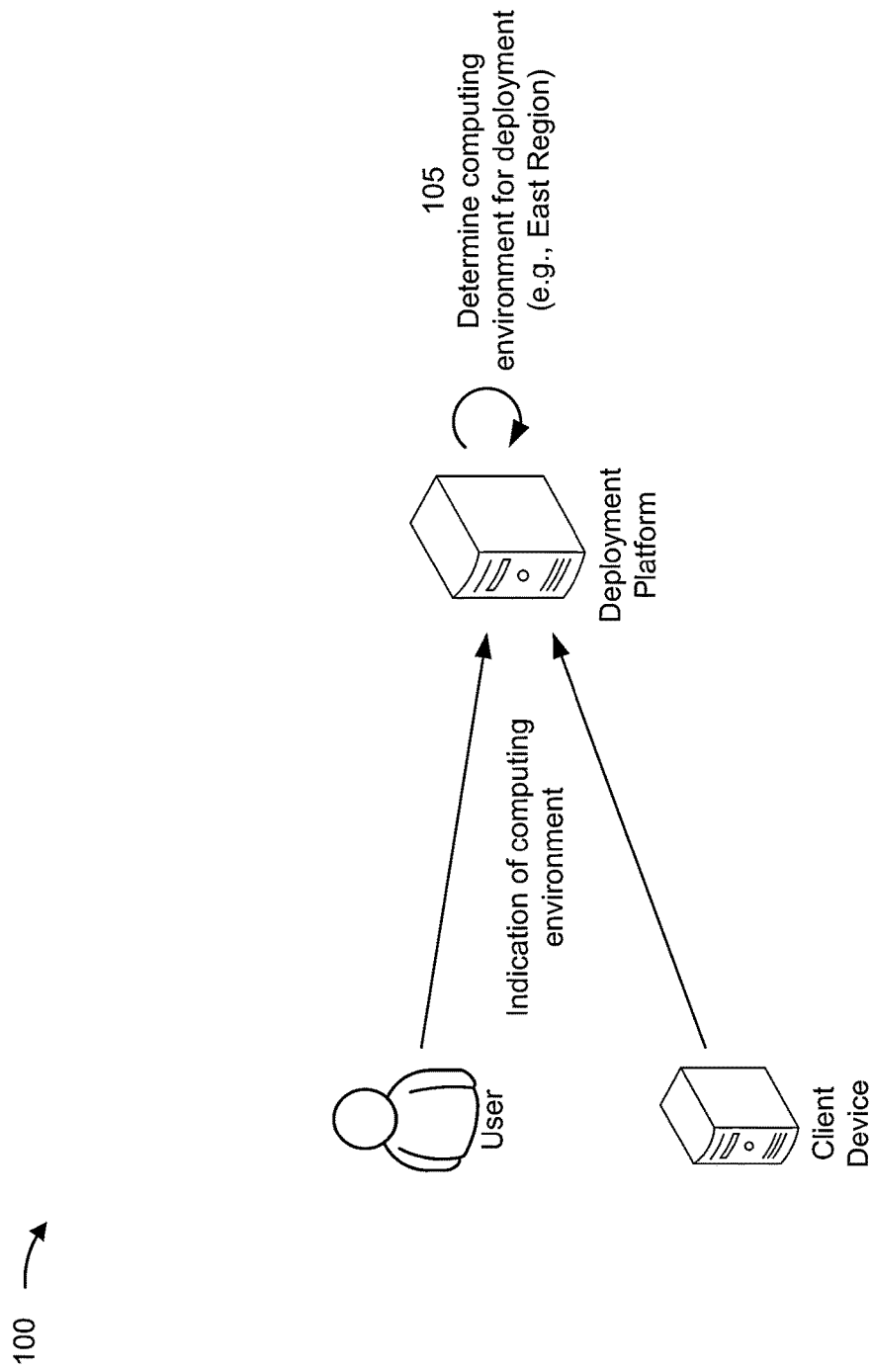
FIGS. 1A-1C are diagrams of an example implementation relating to deployment of a computing environment.

The following detailed description of example implementations refers to the accompanying drawings. The same reference numbers in different drawings may identify the same or similar elements.

A virtual computing environment may provide the functionality of one or more physical computers, such as by using emulation of hardware and/or software that may be implemented in a physical computer. A virtual computing environment may utilize one or more virtual machines (e.g., a virtual representation of a physical computer) to perform a variety of functions. In some cases, an organization may deploy multiple virtual computing environments that each provide a different service. For example, the multiple computing environments may include multiple regional environments (e.g., an east region environment, a west region environment, or the like) and/or multiple deployment environments (e.g., a development environment, a production environment, a green production environment, a blue production environment, or the like), among other examples.

In some cases, each computing environment may be associated with a different infrastructure configuration. Moreover, the differences between the different infrastructure configurations may be slight (e.g., different disk sizes, services being run on different ports, or the like). However, conventional configuration automation tools that are used to provision a computing environment may have difficulty provisioning the multiple computing environments in an efficient manner. For example, a configuration automation tool may require the use of separate configurations (e.g., which may need to be updated for each deployment) and/or separate code repositories (e.g., for IaC definition files) in order to deploy the multiple computing environments. Thus, excessive processing resources and storage resources are consumed.

In some implementations, to solve the technical problems described above, as well as the technical problem of how to deploy multiple similar computing environments, a technical solution is described herein for the efficient deployment of multiple similar computing environments with reduced configuration and storage overhead. In some implementations, a deployment platform may facilitate deployment of multiple computing environments via a deployment application (e.g., a continuous configuration automation tool). The deployment platform may use an orchestration application (e.g., an action sequencer application) to carry out actions associated with retrieval of IaC definition files and provision of the definition files to the deployment application. The orchestration application, when retrieving and providing the definition files, may use a code configuration that is particular to an infrastructure configuration that is to be provisioned.

In some implementations, the deployment platform may determine a code configuration that is to be used for deployment of a particular computing environment associated with a particular infrastructure configuration. The deployment platform (e.g., via the orchestration application) may use the code configuration to obtain a set of IaC definition files, associated with the particular infrastructure configuration, from a repository that stores definition files for multiple infrastructure configurations. The deployment platform (e.g., via the deployment application) may cause deployment of the computing environment using the set of definition files. In this way, the use of separate configurations for the multiple deployments at the deployment application may be avoided, and a single code repository may be used for the multiple deployments. Accordingly, processing resources and storage resources that may otherwise be used in connection with separate configurations and separate code repositories are conserved.

Figure 1B:
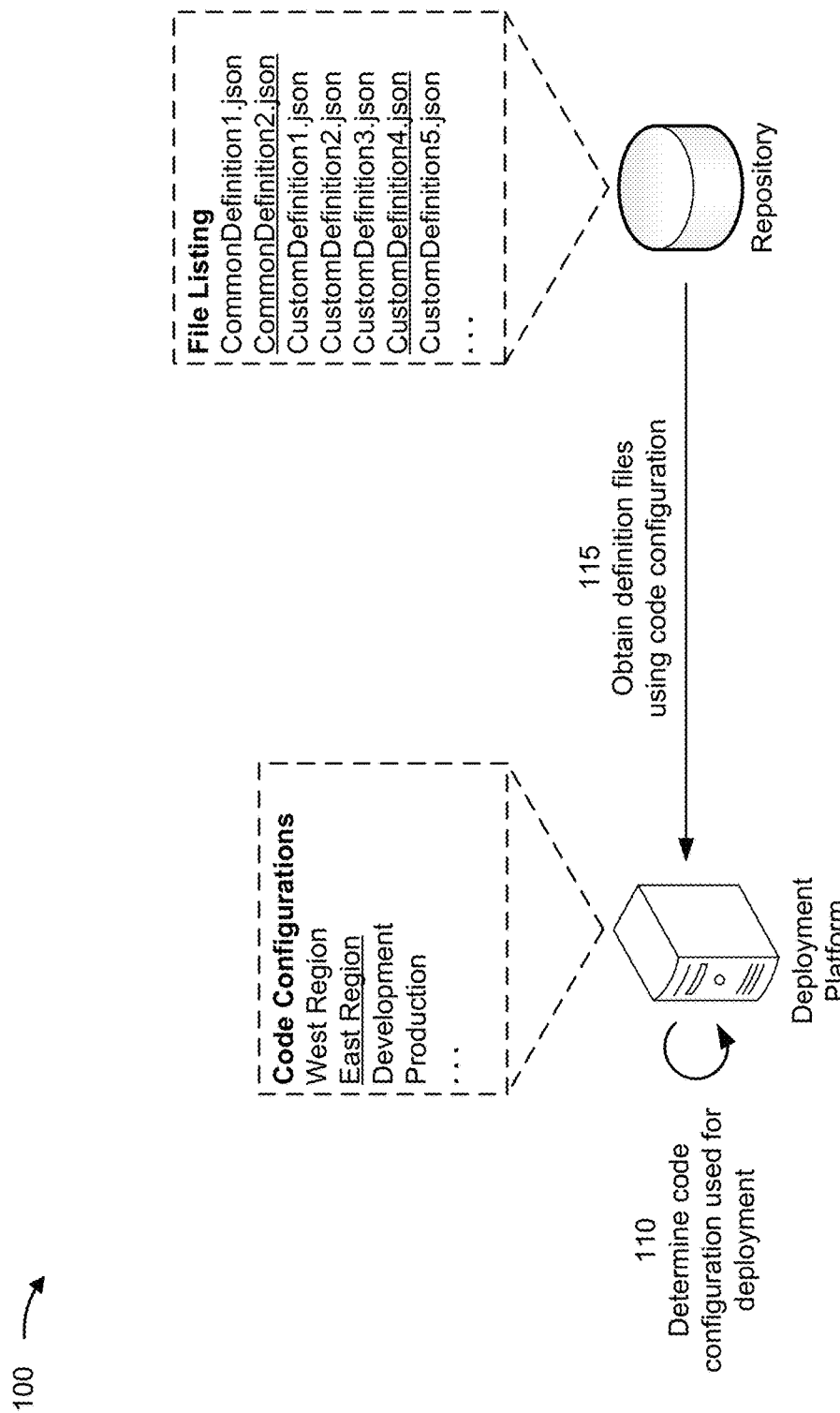
Figure 1C:
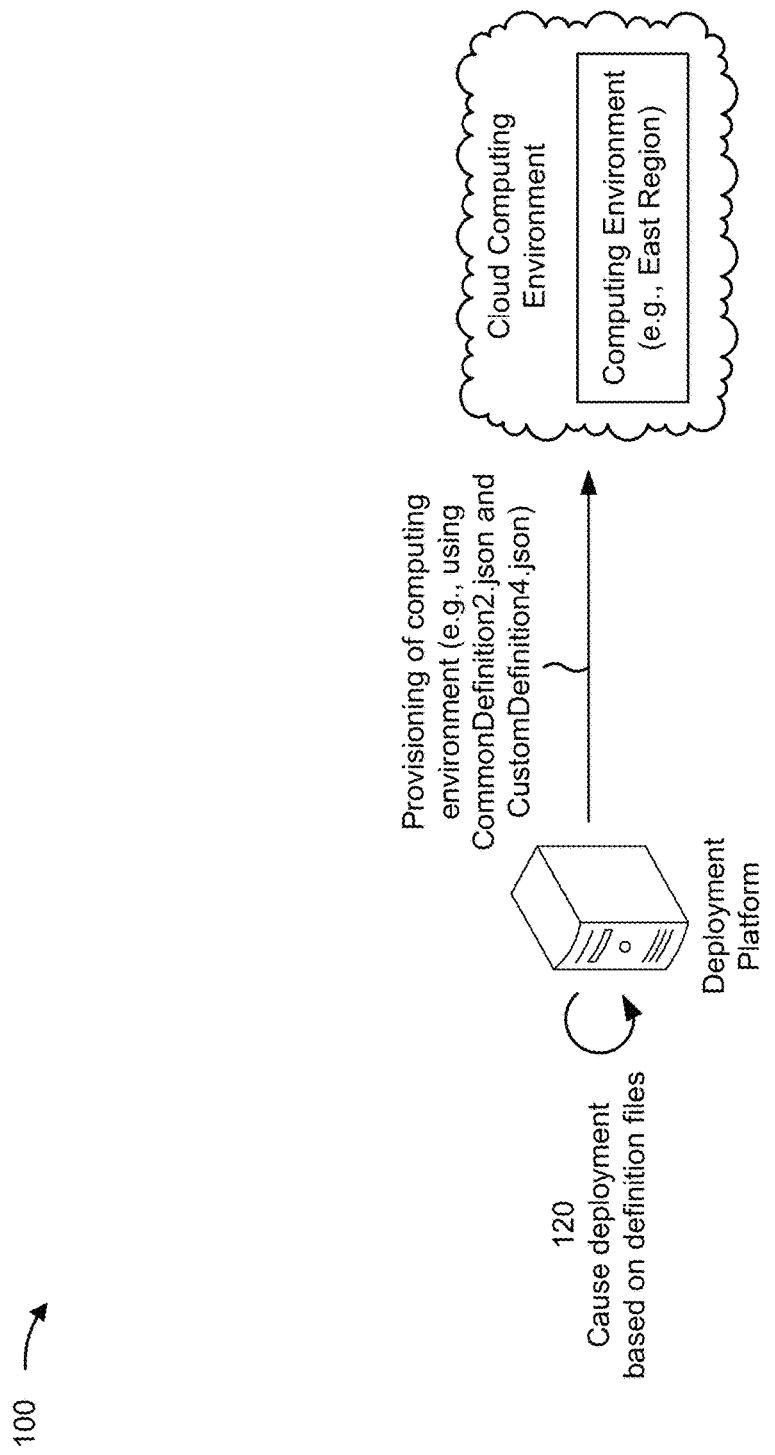

FIGS. 1A-1C are diagrams of an example implementation 100 associated with deployment of a computing environment. As shown in FIGS. 1A-1C, example implementation 100 includes a client device, a deployment platform (e.g., which may include one or more computing devices), a repository, and a cloud computing environment (e.g., which may include one or more computing devices). These devices are described in more detail below in connection with FIG. 2 and FIG. 3.

As shown in FIG. 1A, and by reference number 105, the deployment platform may determine a computing environment for deployment (e.g., in a cloud computing environment or another data center). For example, the deployment platform may receive, from the client device, an indication that the computing environment is to be deployed. As another example, the deployment platform may receive, from a user (e.g., via a user interface of the deployment platform), an indication that the computing environment is to be deployed. The computing environment may be one of a plurality of computing environments for which the deployment platform may facilitate deployment.

The computing environment may be a virtual computing environment. Additionally, or alternatively, the computing environment may be associated with a particular regional environment (e.g., an east region environment, a west region environment, or the like), a particular deployment environment (e.g., a development environment, a production environment, a green production environment, a blue production environment, or the like), or a combination thereof (e.g., a west region production environment). As shown, the deployment platform may determine (e.g., based on an indication) that an east region environment is to be deployed.

The computing environment may be associated with an infrastructure configuration. The infrastructure configuration may define settings for infrastructure (e.g., virtual infrastructure) used for the computing environment. For example, the infrastructure configuration may indicate a configuration for one or more servers (e.g., virtual servers), one or more serverless computing functions (e.g., an Amazon Web Services (AWS) Lambda), one or more load balancers (e.g., virtual load balancers), one or more volumes (e.g., virtual disks), and/or one or more databases, among other examples.

As shown in FIG. 1B, and by reference number 110, the deployment platform may determine a code configuration that is used for the deployment of the computing environment. For example, the deployment platform may determine the code configuration based on receiving the indication that the computing environment is to be deployed. The code configuration that is determined may be associated with the infrastructure configuration associated with the computing environment. For example, the code configuration may be used only for the infrastructure configuration.

The deployment platform may determine, from among a plurality of code configurations, the code configuration that is to be used. For example, each code configuration, of the plurality of code configurations, may be used for deployment of a respective computing environment of the plurality of computing environments. As an example, a west region code configuration may be used for deployment of a west region environment, a development code configuration may be used for deployment of a development environment, and so forth. As shown, the deployment platform may determine that the east region code configuration is to be used for the deployment of the east region environment.

The code configuration may be a configuration file (e.g., an environment file) that is used for a plugin of an orchestration application. The orchestration application may be an action sequencer application (e.g., Fastlane) that provides automation of a sequence of actions. In some implementations, the orchestration application may be a continuous integration wrapper (e.g., coded in Ruby). In some implementations, the deployment platform may invoke the plugin of the orchestration application with the code configuration (e.g., the code configuration may be passed to the plugin upon invocation). In some implementations, the deployment platform may invoke the plugin with any of the plurality of code configurations (but in this particular case, the plugin is invoked with the code configuration).

As shown by reference number 115, the deployment platform may obtain one or more definition files using the code configuration (e.g., based on information in the code configuration). The definition file(s) may include IaC definitions. For example, the definition file(s) may identify the infrastructure configuration using code expressions, arguments, statements, or the like. The definition file(s) may identify the infrastructure configuration using declarative code (e.g., the definition files(s) identify what the infrastructure configuration is to be) and/or imperative code (e.g., the definition file(s) identify infrastructure changes needed to achieve the infrastructure configuration).

In some implementations, the code configuration may identify one or more definition files for the infrastructure configuration. Here, the deployment platform may obtain the definition file(s) identified by the code configuration. In some other implementations, the code configuration may identify the infrastructure configuration. Here, the deployment platform may determine the one or more definition files that can be used to achieve the infrastructure configuration, and the deployment platform may obtain the one or more definition files that are determined. In some implementations, the code configuration may be a definition file, or may include information that would otherwise be included in a definition file.

The deployment platform may obtain the one or more definition files from the repository (e.g., a code repository). The repository may include definition files for the infrastructure configuration associated with the computing environment as well as at least one different infrastructure configuration associated with a different computing environment. That is, the repository (e.g., a single repository) may include definition files associated with multiple infrastructure configurations. In some implementations, each of the multiple infrastructure configurations may be associated with a respective code configuration of the plurality of code configurations, as described above.

In some examples, one or more first definition files may be common to (e.g., shared by) a plurality of (e.g., at least two of) the multiple infrastructure configurations (e.g., CommonDefinition1.json, as shown) and one or more second definition files may be particular to a particular infrastructure configuration (e.g., CustomDefinition1.json, as shown). For example, if the multiple infrastructure configurations are associated with multiple slightly different computing environments, the first definition files may configure infrastructure that is common to the different computing environments and the second definition files may configure respective infrastructure that is unique to each of the different computing environments. Thus, the one or more definition files obtained by the deployment platform may include a set of definition files that includes one or more first definition files common to the multiple infrastructure configurations (e.g., CommonDefinition2.json, as shown) and one or more second definition files particular to (e.g., unique to) the infrastructure configuration (e.g., CustomDefinition4.json, as shown).

In some implementations, all of the definition files included in the repository may be common to the multiple infrastructure configurations. Thus, the deployment platform may obtain all of the definition files (e.g., which may include one or more definition files) included in the repository. Here, the deployment platform may use the code configuration to customize the definition files to the infrastructure configuration associated with the computing environment. For example, the code configuration may identify modifications (e.g., changes, additions, and/or deletions) to the definition files that are needed to conform the definition files to the infrastructure configuration.

In some implementations, the deployment platform may obtain the definition files from the repository using a plugin of the orchestration application. For example, the plugin of the orchestration application may be configured (e.g., in accordance with an action of a sequence of actions) to obtain the definition files from the repository. As an example, the plugin may be configured to obtain the definition files in accordance with the code configuration. In some implementations, the plugin of the orchestration application may be configured (e.g., in accordance with an action of a sequence of actions) to perform modification of the definition files in accordance with the code configuration.

As shown in FIG. 1C, and by reference number 120, the deployment platform may cause deployment of the computing environment based on the one or more definition files that are obtained (or the definition files as modified). In some implementations, the deployment platform may invoke a deployment application with the definition file(s) to cause deployment of the computing environment (e.g., the definition file(s) may be passed to the deployment application upon invocation). For example, the deployment platform may provide the definition file(s) to the deployment application (e.g., to a plugin of the deployment application) to cause deployment of the computing environment. As another example, the deployment platform may provide a configuration, based on the definition file(s), to the deployment application (e.g., to a plugin of the deployment application) to cause deployment of the computing environment. In some implementations, the computing environment may be associated with a particular collection of information (e.g., a workspace, a directory, or the like, that includes state files, variables, configurations, or the like, for the computing environment) of the deployment application. The deployment platform (e.g., via the deployment application) may provision the computing environment in accordance with the definition files (e.g., using CommonDefinition2.json and CustomDefinition4.json, as shown). As shown, the deployment platform may cause deployment of the computing environment in a cloud computing environment or another type of data center.

The deployment application may be an infrastructure deployment tool (e.g., Terraform), such as a stateful infrastructure deployment tool (e.g., that uses a state file for a deployment). The deployment application may communicate an infrastructure configuration, as defined in one or more definition files, to a cloud computing service that is to implement the infrastructure via an application programming interface (API).

In some implementations, the deployment platform may cause deployment of the computing environment using the plugin of the orchestration application. For example, the plugin of the orchestration application may be configured (e.g., in accordance with an action of a sequence of actions) to invoke the deployment application with the definition file(s). As an example, the plugin of the orchestration application may communicate with the plugin of the deployment application in connection with the provision of the definition file(s).

In some examples (e.g., after deployment of the computing environment), the deployment platform may cause deployment of a different computing environment, of the plurality of computing environments, in a similar manner as described above. The different computing environment may be associated with a different infrastructure configuration than the infrastructure configuration associated with the computing environment. For example, the different infrastructure configuration and the infrastructure configuration may use different information to tag a particular infrastructure component (e.g., "west region virtual machine" versus "east region virtual machine"), may use different volume sizes, may run a particular service on different ports, may use a different quantity of virtual machines, may use a different quantity of load balancers, or the like. Moreover, the different computing environment may be associated with a regional environment (e.g., a west region environment) or a deployment environment (e.g., a quality control environment) that is different from a regional environment (e.g., an east region environment) or a deployment environment (e.g., a production environment) associated with the computing environment.

In some implementations, the deployment platform may determine a different code configuration used for deployment of the different computing environment, in a similar manner as described above. The deployment platform may obtain a different set of definition files (e.g., one or more different definition files) for the different infrastructure configuration from the repository (e.g., the same repository from which the set of definition files for the infrastructure configuration were obtained) using the different code configuration, in a similar manner as described above. For example, the deployment platform may obtain the set of definition files using a first code configuration for the infrastructure configuration, and the deployment platform may obtain the different set of definition files using a second code configuration for the different infrastructure configuration. The different set of definition files and the set of definition files may share at least one definition file.

In some implementations, the deployment platform may obtain the same set of definition files from the repository that were obtained for the infrastructure configuration, and the deployment platform may modify the set of definition files in accordance with the code configuration so that the set of definition files conform to the different infrastructure configuration, in a similar manner as described above. The deployment platform may cause deployment of the different computing environment (e.g., the different computing environment may be associated with a different collection of information of the deployment application) based on the different set of definition files (or the definition files as modified), in a similar manner as described above. In this way, the deployment platform may manage the deployment of multiple different (yet similar) computing environments in an efficient manner that conserves computing resources and storage resources.

As indicated above, FIGS. 1A-1C are provided as an example. Other examples may differ from what is described with regard to FIGS. 1A-1C. The number and arrangement of devices shown in FIGS. 1A-1C are provided as an example. In practice, there may be additional devices, fewer devices, different devices, or differently arranged devices than those shown in FIGS. 1A-1C. Furthermore, two or more devices shown in FIGS. 1A-1C may be implemented within a single device, or a single device shown in FIGS. 1A-1C may be implemented as multiple, distributed devices. Additionally, or alternatively, a set of devices (e.g., one or more devices) shown in FIGS. 1A-1C may perform one or more functions described as being performed by another set of devices shown in FIGS. 1A-1C.

Figure 2:
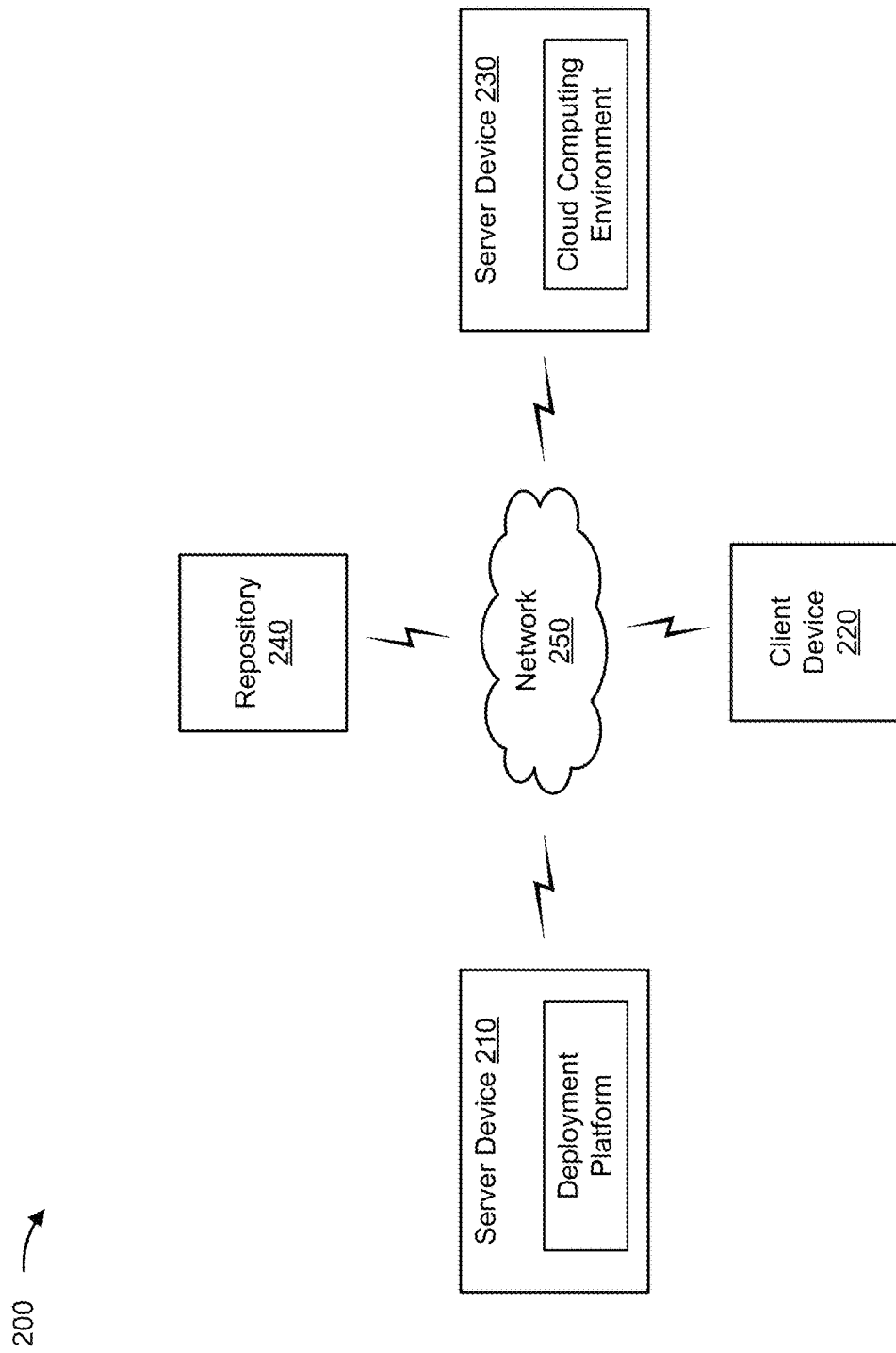
FIG. 2 is a diagram of an example environment in which systems and/or methods described herein may be implemented.

FIG. 2 is a diagram of an example environment 200 in which systems and/or methods described herein may be implemented. As shown in FIG. 2, environment 200 may include a server device 210, a client device 220, a service device 230, a repository 240, and a network 250. Devices of environment 200 may interconnect via wired connections, wireless connections, or a combination of wired and wireless connections.

The server device 210 includes one or more devices capable of receiving, generating, storing, processing, providing, and/or routing information associated with deployment of a cloud computing environment, as described elsewhere herein. As shown, the server device 210 may implement the deployment platform. The server device 210 may include a communication device and/or a computing device. For example, the server device 210 may include a server, such as an application server, a client server, a web server, a database server, a host server, a proxy server, a virtual server (e.g., executing on computing hardware), or a server in a cloud computing system. In some implementations, the service device 210 may implement the orchestration application and/or the deployment application.

The client device 220 includes one or more devices capable of receiving, generating, storing, processing, and/or providing information associated with deployment of a cloud computing environment, as described elsewhere herein. For example, the client device 220 may include one or more devices capable of providing, to the server device 210, an indication of a computing environment that is to be deployed. The client device 220 may include a communication device and/or a computing device. For example, the client device 220 may include a wireless communication device, a mobile phone, a user equipment, a laptop computer, a tablet computer, a desktop computer, a wearable communication device (e.g., a smart wristwatch, a pair of smart eyeglasses, a head mounted display, or a virtual reality headset), or a similar type of device.

The server device 230 includes one or more devices capable of receiving, generating, storing, processing, providing, and/or routing information associated with a cloud computing service, as described elsewhere herein. For example, the server device 230 may receive, from the server device 210, information identifying an infrastructure that is to be deployed in a cloud computing environment (or another type of data center), and the server device 230 may provision the infrastructure in accordance with the information. As shown, the server device 230 may implement the cloud computing environment. The server device 230 may include a communication device and/or a computing device. For example, the server device 230 may include a server, such as an application server, a client server, a web server, a database server, a virtual server (e.g., executing on computing hardware), or a server in a cloud computing system. In some implementations, the server device 230 includes computing hardware used in a cloud computing environment.

The repository 240 includes one or more devices capable of receiving, generating, storing, processing, and/or providing information associated with one or more infrastructure configurations (e.g., IaC definition files that define the one or more infrastructure configurations), as described elsewhere herein. The repository 240 may include a communication device and/or a computing device. For example, the repository 240 may include a database, a server, a database server, a web server, or a similar type of device. The repository 240 may communicate with the server device 210, as described elsewhere herein.

The network 250 includes one or more wired and/or wireless networks. For example, the network 250 may include a wireless wide area network (e.g., a cellular network or a public land mobile network), a local area network (e.g., a wired local area network or a wireless local area network (WLAN), such as a Wi-Fi network), a personal area network (e.g., a Bluetooth network), a near-field communication network, a telephone network, a private network, the Internet, and/or a combination of these or other types of networks. The network 250 enables communication among the devices of environment 200.

The quantity and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
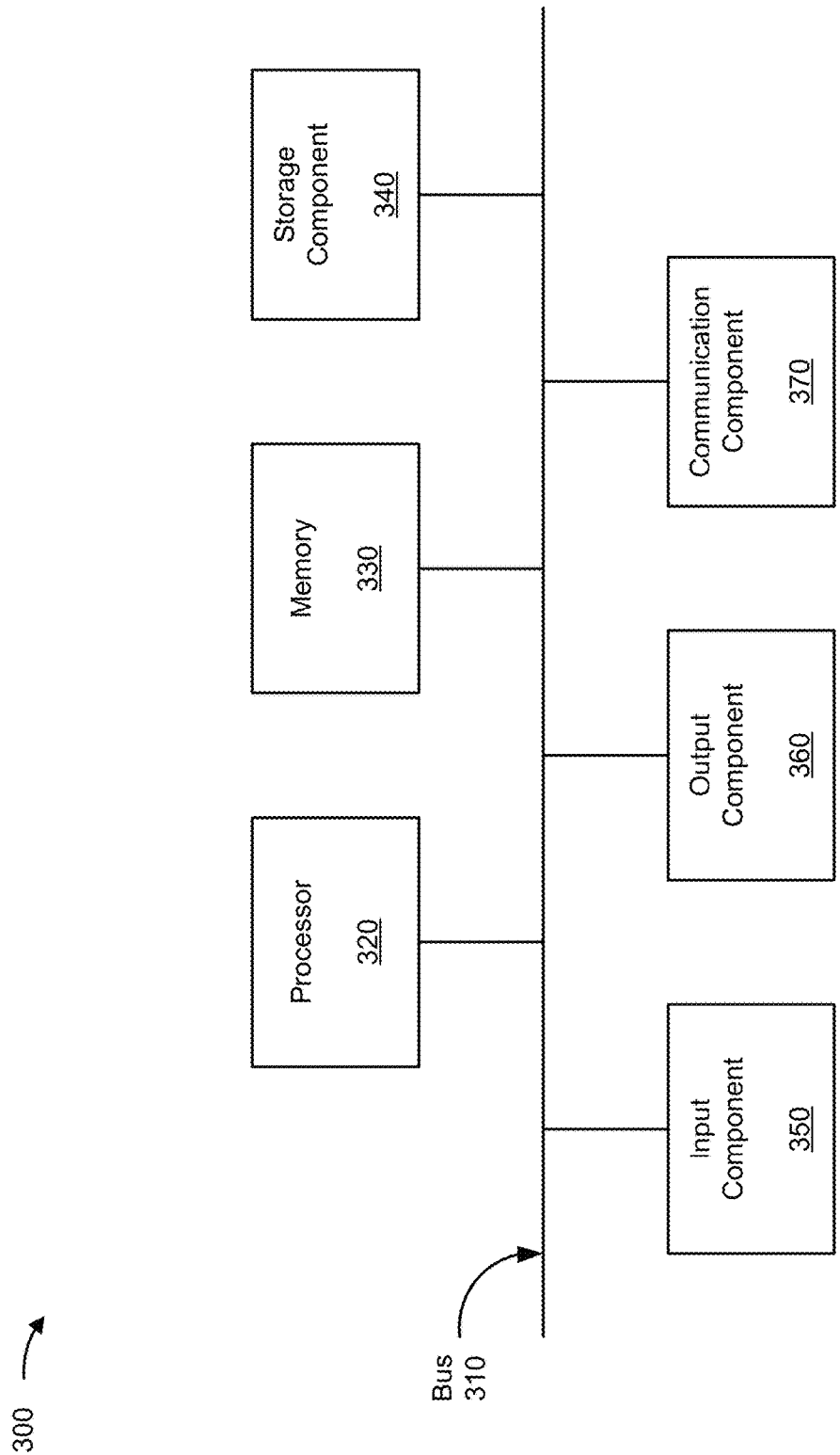
FIG. 3 is a diagram of example components of one or more devices of FIG. 2.

FIG. 3 is a diagram of example components of a device 300, which may correspond to service device 210, client device 220, server device 230, and/or repository 240. In some implementations, service device 210, client device 220, server device 230, and/or repository 240 may include one or more devices 300 and/or one or more components of device 300. As shown in FIG. 3, device 300 may include a bus 310, a processor 320, a memory 330, a storage component 340, an input component 350, an output component 360, and a communication component 370.

Bus 310 includes a component that enables wired and/or wireless communication among the components of device 300. Processor 320 includes a central processing unit, a graphics processing unit, a microprocessor, a controller, a microcontroller, a digital signal processor, a field-programmable gate array, an application-specific integrated circuit, and/or another type of processing component. Processor 320 is implemented in hardware, firmware, or a combination of hardware and software. In some implementations, processor 320 includes one or more processors capable of being programmed to perform a function. Memory 330 includes a random access memory, a read only memory, and/or another type of memory (e.g., a flash memory, a magnetic memory, and/or an optical memory).

Storage component 340 stores information and/or software related to the operation of device 300. For example, storage component 340 may include a hard disk drive, a magnetic disk drive, an optical disk drive, a solid state disk drive, a compact disc, a digital versatile disc, and/or another type of non-transitory computer-readable medium. Input component 350 enables device 300 to receive input, such as user input and/or sensed inputs. For example, input component 350 may include a touch screen, a keyboard, a keypad, a mouse, a button, a microphone, a switch, a sensor, a global positioning system component, an accelerometer, a gyroscope, and/or an actuator. Output component 360 enables device 300 to provide output, such as via a display, a speaker, and/or one or more light-emitting diodes. Communication component 370 enables device 300 to communicate with other devices, such as via a wired connection and/or a wireless connection. For example, communication component 370 may include a receiver, a transmitter, a transceiver, a modem, a network interface card, and/or an antenna.

Device 300 may perform one or more processes described herein. For example, a non-transitory computer-readable medium (e.g., memory 330 and/or storage component 340) may store a set of instructions (e.g., one or more instructions, code, software code, and/or program code) for execution by processor 320. Processor 320 may execute the set of instructions to perform one or more processes described herein. In some implementations, execution of the set of instructions, by one or more processors 320, causes the one or more processors 320 and/or the device 300 to perform one or more processes described herein. In some implementations, hardwired circuitry may be used instead of or in combination with the instructions to perform one or more processes described herein. Thus, implementations described herein are not limited to any specific combination of hardware circuitry and software.

The quantity and arrangement of components shown in FIG. 3 are provided as an example. Device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

Figure 4:
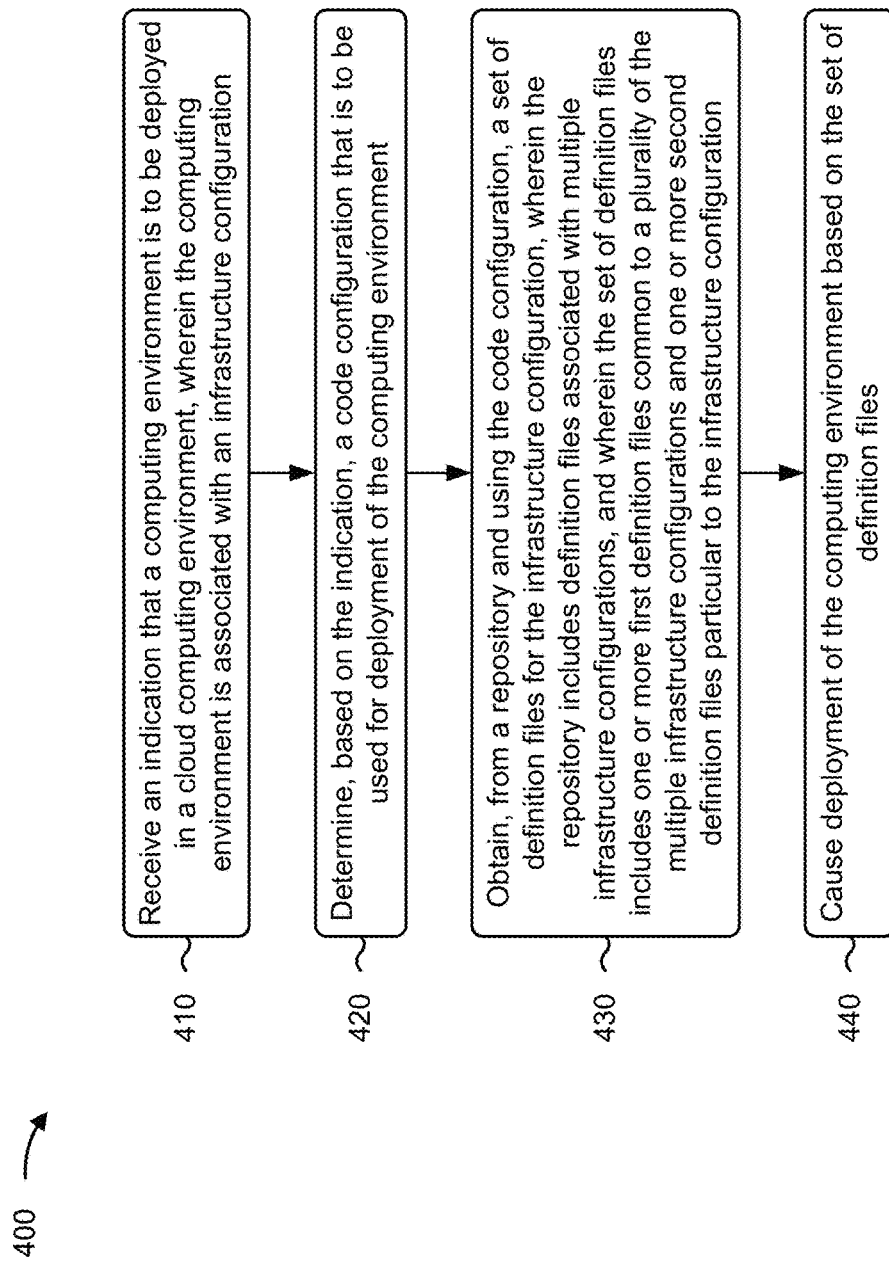
FIG. 4 is a flowchart of an example process relating to deployment of a computing environment.

FIG. 4 is a flowchart of an example process 400 associated with deployment of a computing environment. In some implementations, one or more process blocks of FIG. 4 may be performed by a device (e.g., server device 210). In some implementations, one or more process blocks of FIG. 4 may be performed by another device or a group of devices separate from or including the device, such as client device 220 and/or server device 230. Additionally, or alternatively, one or more process blocks of FIG. 4 may be performed by one or more components of device 300, such as processor 320, memory 330, storage component 340, input component 350, output component 360, and/or communication component 370.

As shown in FIG. 4, process 400 may include receiving an indication that a computing environment is to be deployed in a cloud computing environment, wherein the computing environment is associated with an infrastructure configuration (block 410). As further shown in FIG. 4, process 400 may include determining, based on the indication, a code configuration that is to be used for deployment of the computing environment (block 420). As further shown in FIG. 4, process 400 may include obtaining, from a repository and using the code configuration, a set of definition files for the infrastructure configuration, wherein the repository includes definition files associated with multiple infrastructure configurations, and wherein the set of definition files includes one or more first definition files common to a plurality of the multiple infrastructure configurations and one or more second definition files particular to the infrastructure configuration (block 430). As further shown in FIG. 4, process 400 may include causing deployment of the computing environment based on the set of definition files (block 440).

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

The foregoing disclosure provides illustration and description, but is not intended to be exhaustive or to limit the implementations to the precise forms disclosed. Modifications may be made in light of the above disclosure or may be acquired from practice of the implementations.

As used herein, the term "component" is intended to be broadly construed as hardware, firmware, or a combination of hardware and software. It will be apparent that systems and/or methods described herein may be implemented in different forms of hardware, firmware, and/or a combination of hardware and software. The actual specialized control hardware or software code used to implement these systems and/or methods is not limiting of the implementations. Thus, the operation and behavior of the systems and/or methods are described herein without reference to specific software code—it being understood that software and hardware can be used to implement the systems and/or methods based on the description herein.

Although particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiple of the same item.

No element, act, or instruction used herein should be construed as critical or essential unless explicitly described as such. Also, as used herein, the articles "a" and "an" are intended to include one or more items, and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A system for deploying a computing environment, the system comprising:
one or more memories; and
one or more processors, coupled to the one or more memories, configured to:
determine a code configuration that is to be used for deployment of a computing environment;
utilize the code configuration to invoke a plugin of an orchestration application to obtain a set of definition files for an infrastructure configuration,
wherein the plugin is configured to perform modification of the set of definition files in accordance with the code configuration; and
cause deployment of the computing environment based at least in part on the set of definition files.

2. The system of claim 1, wherein the one or more processors, when causing deployment of the computing environment, are configured to:
provide the set of definition files to a deployment application to cause deployment of the computing environment.

3. The system of claim 1, wherein the code configuration is used only for the infrastructure configuration associated with the computing environment.

4. The system of claim 1, wherein the set of definition files include: a first subset of definition files common to a plurality of infrastructure configurations, including the infrastructure configuration, and a second subset of definition files particular to the infrastructure configuration.

5. The system of claim 1, wherein the one or more processors are further configured to:
obtain, from a repository and using a different code configuration, a different set of definition files for a different infrastructure configuration associated with a different computing environment; and
cause deployment of the different computing environment based at least in part on the different set of definition files.

6. The system of claim 5, wherein the different computing environment is associated with a deployment environment that is different from a particular production environment associated with the computing environment.

7. The system of claim 1, wherein the infrastructure configuration indicates a configuration for one or more of a server, a serverless computing function, a load balancer, a volume, or a database.

8. A method of deploying a computing environment, comprising:
determining, by a device, that the computing environment is to be deployed,
wherein the computing environment is associated with an infrastructure configuration;
determining, by the device, a code configuration that identifies one or more definition files for the infrastructure configuration;
utilizing, by the device, the code configuration to invoke a plugin of an orchestration application to obtain the one or more definition files for the infrastructure configuration,
wherein the plugin is configured to perform modification of the one or more definition files in accordance with the code configuration; and
causing, by the device, deployment of the computing environment based at least in part on the one or more definition files.

9. The method of claim 8, wherein causing deployment of the computing environment comprises:
providing the one or more definition files to a deployment application to cause deployment of the computing environment.

10. The method of claim 8, further comprising:
obtaining, by the device, one or more different definition files for a different infrastructure configuration associated with a different computing environment; and
causing, by the device, deployment of the different computing environment based at least in part on the one or more different definition files.

11. The method of claim 10, wherein the one or more definition files and the one or more different definition files share at least one definition file.

12. The method of claim 10, wherein the code configuration is a first code configuration, and
wherein the one or more different definition files are obtained using a second code configuration for the different infrastructure configuration associated with the different computing environment.

13. The method of claim 8, wherein the computing environment is associated with a particular production environment that includes one of a blue production environment or a green production environment.

14. A non-transitory computer-readable medium storing a set of instructions for deploying a computing environment, the set of instructions comprising:
one or more instructions that, when executed by one or more processors of a device, cause the device to:
determine a code configuration that is to be used for the computing environment, wherein the code configuration identifies a set of definition files;
utilize the code configuration to invoke a plugin of an orchestration application to obtain the set of definition files for an infrastructure configuration,
wherein the plugin is configured to perform modification of the set of definition files in accordance with the code configuration; and
provide the set of definition files to a deployment application.

15. The non-transitory computer-readable medium of claim 14, wherein the one or more instructions, when executed by the one or more processors, further cause the device to:
receive a user input indicating that the computing environment is to be deployed.

16. The non-transitory computer-readable medium of claim 14, wherein the plugin is a first plugin, and wherein the set of definition files are obtained using the first plugin, and
wherein the set of definition files are provided to a second plugin of the deployment application.

17. The non-transitory computer-readable medium of claim 14, wherein the code configuration is used only for the infrastructure configuration associated with the computing environment.

18. The non-transitory computer-readable medium of claim 14, wherein the computing environment is to be deployed in a cloud computing environment.

19. The non-transitory computer-readable medium of claim 14, wherein the orchestration application comprises an action sequencer application.

20. The non-transitory computer-readable medium of claim 14, wherein the set of definition files include: a first subset of definition files common to a plurality of infrastructure configurations, including the infrastructure configuration, and a second subset of definition files particular to the infrastructure configuration.

\* \* \* \* \*